United States Patent [19]

Kojima

[11] Patent Number: 4,934,424

[45] Date of Patent: Jun. 19, 1990

[54] PNEUMATIC TIRE HAVING BLOCKS WITH PLURAL TRANSVERSE SIPES AT DIFFERENT DEPTHS

[75] Inventor: Hiroshi Kojima, Hino, Japan

[73] Assignee: Bridgestone Corporation, Tokyo, Japan

[21] Appl. No.: 156,696

[22] Filed: Feb. 17, 1988

[30] Foreign Application Priority Data

Feb. 20, 1987 [JP] Japan .............................. 62-22942[U]

[51] Int. Cl.$^5$ .............................................. B60C 11/12
[52] U.S. Cl. ............................ 152/209 R; 152/DIG. 3
[58] Field of Search ............ 152/209 R, 209 D, 204 B, 152/209 A, DIG. 3, 154.2

[56] References Cited

U.S. PATENT DOCUMENTS

| | | | |
|---|---|---|---|
| 2,708,957 | 5/1955 | Constantakis et al. | 152/209 R |
| 3,998,256 | 12/1976 | Verdier | 152/209 R |
| 4,298,046 | 11/1981 | Herbelleau et al. | 152/209 |
| 4,449,560 | 5/1984 | Tansei et al. | 152/209 R |
| 4,598,747 | 7/1986 | Flechtner | 152/209 R |
| 4,609,022 | 9/1986 | Fetty et al. | 152/209 R |
| 4,667,718 | 5/1987 | Fontaine | 152/209 R |
| 4,723,584 | 2/1988 | Yamaguchi et al. | 152/209 R |

FOREIGN PATENT DOCUMENTS 0202122 11/1986 European Pat. Off. .
2030937 4/1980 United Kingdom .......... 152/209 D Primary Examiner—Michael W. Ball
Assistant Examiner—Geoffrey L. Knable
Attorney, Agent, or Firm—Sughrue, Mion, Zinn, Macpeak & Seas

[57] ABSTRACT

To improve biased abrasion or traction and brake performance of a pneumatic tire formed with a great number of blocks partitioned by the main circumferential grooves and transverse grooves on the tread thereof, each of the block is formed with at least three sipes arranged regular intervals along the tire circumferential direction and extending over an entire width of each block along the tire transverse direction in such a way that at least one end of each sipe is open to the main circumferential groove and a central sipe of each block is formed the deepest as compared with other side sipes.

13 Claims, 4 Drawing Sheets

TIRE ROTATING DIRECTION

TIRE ROTATING DIRECTION

TIRE ROTATING DIRECTION

TIRE ROTATING DIRECTION

PNEUMATIC TIRE HAVING BLOCKS WITH PLURAL TRANSVERSE SIPES AT DIFFERENT DEPTHS

BACKGROUND OF THE INVENTION

1. Field of the Invention

The present invention relates to a pneumatic radial tire, and more specifically to an improvement in a pneumatic tire formed with a block pattern on the tread thereof.

2. Description of the Prior Art

In general, pneumatic tires called all-weather or studless tires are formed with a great number of blocks partitioned by a plurality of main circumferential grooves extending in the tire circumferential direction and arranged with regular intervals in the axial direction of the tread, and a plurality of transverse grooves extending to cross these main grooves at angles with respect to the main circumferential grooves and arranged at regular intervals in the circumferential direction of the tread.

In order to improve the running performance on dry or snow and ice roads, the studless tire is formed with a number of sipes on each block. In particular, by dividing each block into smaller blocks by these sipes, the block rigidity is lowered to improve the adherence characteristics to ground and further to increase the block edge effect or ground holding effect based upon the circumferential ridge lines extending in the tire rotating direction of the block.

In the prior-art pneumatic tire of this kind, however, since the depth of these sipes formed in each block is substantially the same in each block, there exists a problem in that both the side ends of each block (when seen along the vehicle travel direction) easily wear away when the tire is rotated under heavy load. This results in biased abrasion in each block in the circumferential direction of the tire. As a result, the adherence characteristics to ground are deteriorated, the edge effects on both block side ends are reduced; and the traction and brake performance required for studless tires are degraded.

SUMMARY OF THE INVENTION

With these problems in mind, therefore, it is the primary object of the present invention to provide a pneumatic tire having a tread block pattern which can eliminate biased abrasion and therefore improve adherence characteristics without degrading traction and brake performance.

To achieve the above-mentioned object, in a pneumatic tire of toroidal shape having a cylindrical tread portion and a pair of side wall portions extending from both ends of the tread radially inward, the cylindrical tread portion of the present invention comprises (a) a plurality of main circumferential grooves arranged at substantially regular intervals along the transversal direction of the tire; (b) a plurality of transverse grooves extending across said main circumferential grooves and arranged at substantially regular intervals along the circumferential direction of tire; (c) a plurality of blocks partitioned by said main circumferential grooves and said transverse grooves, each of said blocks being formed with at least three sipes arranged at substantially regular intervals along the tire circumferential direction and extending substantially over an entire width of each block in the tire transverse direction in such a way that at least one end of each sipe is open to one of said main circumferential grooves and a central sipe of each block is formed the deepest as compared with the other side sipes.

The inventors have made various experiments about the adherence characteristics of blocks partitioned by sipes in the pneumatic tires of this type, and the experiments have indicated that: in the tires in which the sipes are formed substantially at regular intervals in the circumferential direction with substantially the same depth, the adherence characteristics along the block circumferential direction are lowered extremely on both the side areas of the block, so that both the block side areas tend to be vibrated into early abrasion.

Therefore, the inventors have found that it is possible to reduce the above-mentioned biased abrasion by making the circumferential rigidity on each block as uniform as possible.

In the pneumatic tire of the present invention, since at least three sipes are arranged on each block at substantially regular intervals in the tire circumferential direction extending over the entire width of each block in the substantially tire axial direction, it is possible to improve the traction and brake performance.

Further, in the present invention, since a central sipe is formed deeper than other side sipes, in particular, it is possible to increase the rigidity at both the block end areas as compared with the tire in which the sipes with a uniform depth are formed extending over the block, thus improving biased abrasion, adherence characteristics, and edge effects.

BRIEF DESCRIPTION OF THE DRAWINGS

The features and advantages of the pneumatic tire of the present invention will be more clearly appreciated from the following description of the preferred embodiment of the present invention taken in conjunction with the accompanying drawings in which like reference numerals designate the same or similar elements or sections throughout the figures thereof and in which.

DETAILED DESCRIPTION OF THE PREFERRED EMBODIMENTS

Embodiments of a pneumatic tire according to the present invention will be described with reference to the attached drawings.

Figure 1A:
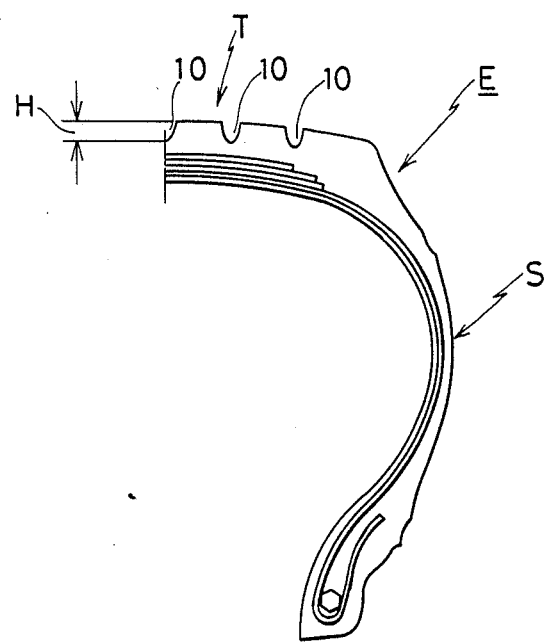
FIG. 1(A) is a cross-sectional view showing a pneumatic tire of the present invention.

In FIG. 1(A), a pneumatic tire E of the present invention is composed of a tread portion T extending roughly in cylindrical shape and a pair of side walls S extending from both ends of this tread portion T in the radially inward direction. The tread portion T is formed with a plurality of main circumferential grooves 10 arranged at regular intervals along the tire axial direction, a number of transverse grooves 20 extending so as to cross the main grooves 10 at substantially regular intervals in the tire circumferential direction, and a great number of blocks 30 partitioned by the main grooves 10 and the transverse grooves 20.

Figure 1B:
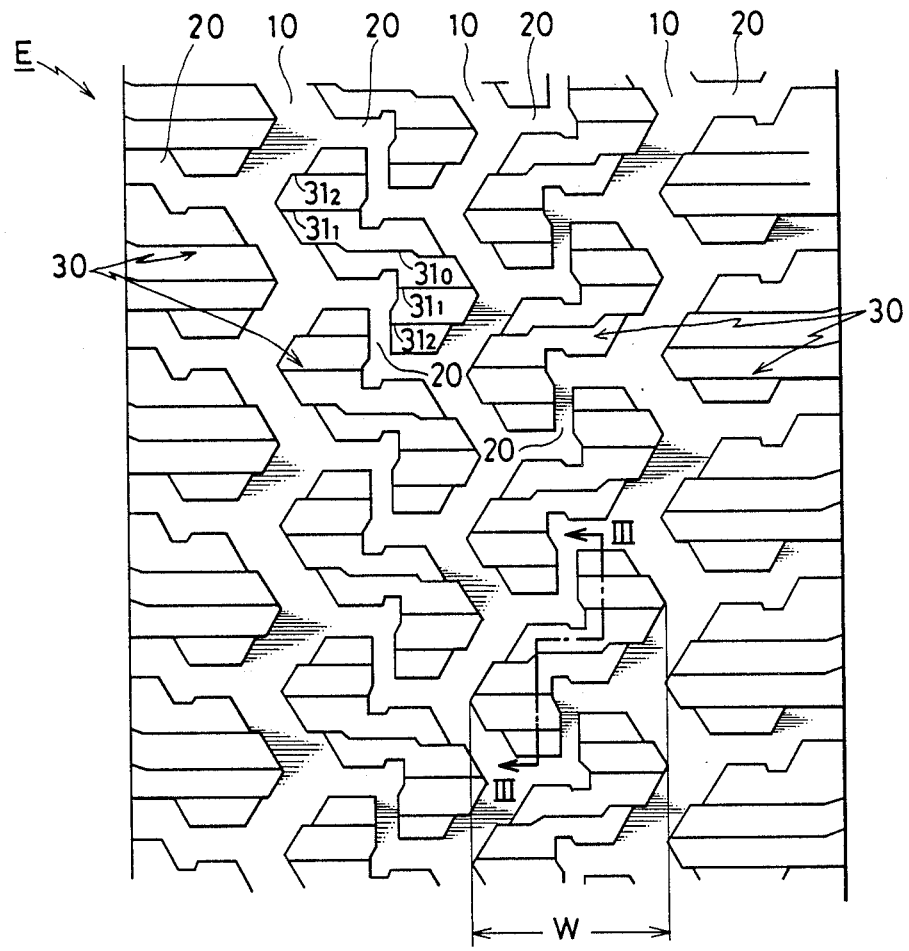
FIG. 1(B) is an exploded view showing a tread pattern of a first embodiment of the tire of the present invention shown in FIG. 1.
Figure 2A:
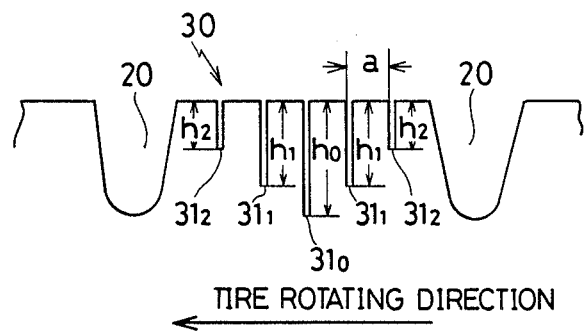
FIG. 2(A) is an enlarged cross-sectional view taken along the lines III—III in FIG. 1(B)

The blocks 30 are arranged on the tread extending both in the circumferential and transversal directions, as shown in FIG. 1(B). In particular, each block 30 is formed with at least three sipes (tire sipes in FIG. 1(B)) arranged at regular intervals in the circumferential direction and extending along the substantially axial direction of the tire over the width of each block 30 in such a way that at least one end (both ends in FIG. 1(B)) of each sipe reaches one open end of the main circumferential groove 10 and a depth $h_0$ of the central sipe $31_0$ is the deepest in comparison with those $h_1$ and $h_2$ of the other sipes $31_1$ and $31_2$ formed on both the sides of the block 30 (as depicted in FIG. 2(A)). The width of the sipes 31 lies in a range from 0.1 to 1.5 mm, and preferably lies between 0.5 and 1 mm.

As described above, it is necessary to arrange at least three sipes 31 on each block 30 at regular intervals along the tire circumference. This is because the tread of each block 30 can be divided into smaller areas by at least three sipes 31 to appropriately reduce the rigidity of each block 30, so that the adherence characteristics and the edge effects can be increased and therefore the traction and brake performance can be improved on dry or even snow and/or ice roads.

Further, since the sipes are arranged over the entire width W of each block 30 so as to extend in the tire axial direction, the traction and the brake performance can be improved. Further, it is preferable that the interval a between two sipes 31 along the tire circumferential direction is determined within a range of 2 to 5% of the tire ground-contact length determined when a standard load corresponding to a designed tire inflation pressure is applied to the tire, in order to improve various tire performances.

Further, it is necessary to determine the depth $h_0$ of the central sipe $31_0$ to be deeper than those of other sipes formed on both sides of each block. By doing this, it is possible to increase the rigidity on both the side ends of the block as compared with the tire having the blocks at which the sipes with the same depth are formed over the block, thus improving the biased abrasion, adherence characteristics, and edge effects, without lowering the traction and brake performance. Further, in this case, it is possible to make uniform the adherence pressure to the ground by gradually decreasing the depth of the sipes from the central sipe toward both the side end sipes.

The depth $h_0$ of the sipes $31_0$ is 70 to 100% of that H of the main groove 10 at the central area of each block and 30 to 50% thereof at both the sides thereof. However, it is further preferable to determine the depth $h_0$ of the sipes $31_0$ to lie about 75% of H at the central area and about 40% of H at both the sides thereof in order to further make uniform the contact pressure, improve biased abrasion and thus the adherence characteristics and edge effects.

In the first embodiment shown in FIG. 1(B), five sipes $31_2$, $31_1$, $31_0$, $31_1$ and $31_2$ are formed extending over the width W of the block 30 roughly in parallel to the tire axial direction and being open to the main grooves 10 at both the right and left side ends thereof.

FIG. 2(A) shows a first modification of the first embodiment in which the depth $h_0$ of the central sipe 31 is the deepest; that $h_1$ of the two adjacent sipes $31_1$ is shallower than that $h_0$ of the central sipe 31; and that $h_2$ of the two side sipes $31_2$ is the shallowest. In other words, the central sipe $31_0$ is the deepest and the depth of the other sipes $31_1$ and $31_2$ is gradually decreased beginning from the deepest central sipe $31_0$.

Figure 2B:
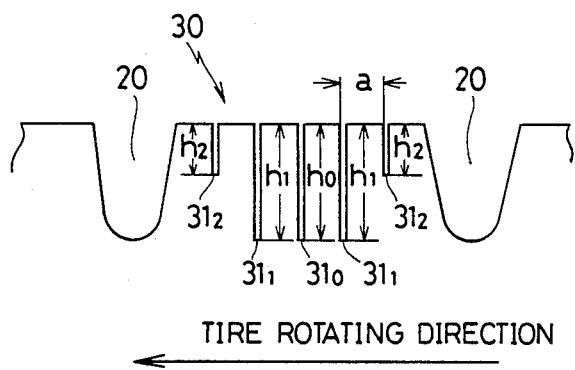
FIG. 2(B) is an enlarged cross-sectional view taken along the lines III—III in FIG. 2, which shows another modification of the tire thereof.

FIG. 2(B) shows a second modification of the first embodiment in which the depth $h_0$, $h_1$ of the central sipe $31_0$ and the two adjacent sipes $31_1$ are the same, and that $h_2$ of the two side sipes $31_2$ is shallower than that $h_0 = h_1$ of the sipes $31_0$ and $31_1$.

Figure 2C:
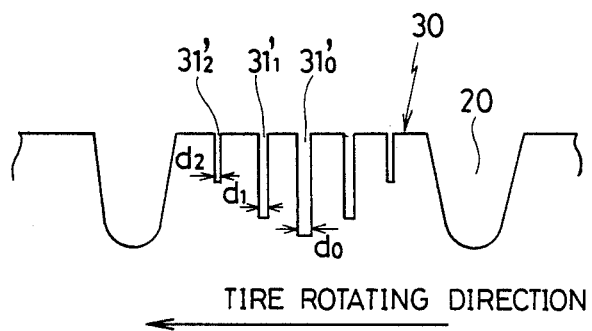
FIG. 2(C) is an enlarged cross-sectional view taken along the line III—III in FIG. 2, which shows a further modification of the tire thereof.

FIG. 2(C) shows a third modification of the first embodiment in which the depth of the five sipes $31_0'$, $31_1'$ and $31_2'$ is gradually decreased beginning from the deepest central sipe $31_0'$ and further the width of these five sipes is gradually decreased beginning from the widest central sipe $31_0'$ as $d_0 > d_1 > d_2$. In the case of passenger cars, these widths are $d_1 =$ about 1.2 mm, $d_2 =$ about 0.8 mm and $d_3 =$ about 0.5 mm.

Figure 3A:
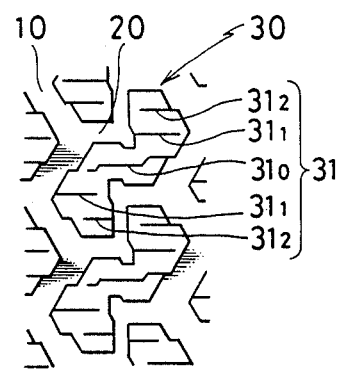
FIG. 3(A) is an exploded view showing a tread pattern of a second embodiment of the tire of the present invention shown in FIG. 1.

FIG. 3(A) shows a second embodiment of the pneumatic tire of the present invention. In this embodiment, only one end of the sipes is alternately open to the main groove 10.

Figure 3B:
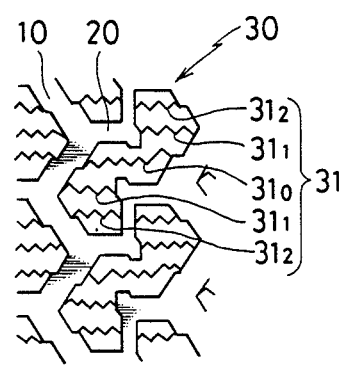
FIG. 3(B) is an exploded view showing a tread pattern of a third embodiment of the tire of the present invention shown in FIG. 1.

FIG. 3(B) shows a third embodiment of the pneumatic tire of the present invention. In this embodiment, the sipes are formed in zigzag fashion. Further, although not shown, it is possible to combine the second and third embodiments, in which only one end of the zigzag sipes is alternately open to the main groove 10.

Further, in the above embodiments, although the sipes are formed roughly in parallel to the tire axial direction, it is of course possible to form the sipes inclined at a small inclination angle with respect to the tire axial direction.

EXAMPLES

To verify the effect of the pneumatic tire of the present invention, the biased abrasion produced on both sides of the blocks and the traction and brake performance have been measured by use of test tires having a tread pattern as shown in FIGS. 1(A) and (B). The more detailed specifications of these test tires were as follows:

(Invention tires)

* Tire size: 165 R13
* Tread pattern: as shown in FIG. 1(B)
* Width d of sipe 31: 0.5 mm
* Depth $h_0$ of sipe $31_0$: 8 mm
* Depth $h_1$ of sipe $31_1$: 6 mm
* Depth $h_2$ of sipe $31_2$: 4 mm
* Depth H of main groove 10: 10.5 mm
* Carcass, belt, etc.: the same as the ordinary tire (Comparative tires)

* Tire size: 165 R13
* Tread pattern: as shown in FIG. 1(B)
* Width d of sipe 31: 0.5 mm
* Depth $h_0$ of sipe $31_0$: 8 mm
* Depth $h_1$ of sipe $31_1$: 8 mm
* Depth $h_2$ of sipe $31_2$: 8 mm
* Depth H of main groove 10: 10.5 mm
* Carcass, belt, etc.: the same as the ordinary tire (How to measure)

* Biased abrasion

A difference in abrasion between the central area and both the side areas of each tire block was measured after the tire had traveled 3000 km on the ordinary road. The average value thereof is listed in table below by an index determined with the comparative tire index as 100. Therefore, the smaller the index is, the better will be the biased abrasion characteristics.

* Traction performance

A vehicle at rest is tracted by another vehicle via a load cell on a natually hardened snow road in order to measure peak friction coefficients and spinning friction coefficient. The average value thereof is listed in table below by an index determined with the comparative tire index as 100. Therefore, the larger the index is, the better will be the traction performance.

* Brake performance

Brake distances at 40 km/hour were measured on a naturally hardened snow road, a slippery snow road and an iced road. The average value thereof is listed in table below by an index determined with the comparative tire index as 100. Therefore, the smaller the index is, the better will be the brake performance.

|  | Comparative tires | Invention tires |
|---|---|---|
| Biased abrasion | 100 | 70 |
| Traction | 100 | 104 |
| Brake | 100 | 94 |

The above table indicates that the invention tires are superior to the comparative tires in biased abrasion and tracking and brake performances.

As described above, in the pneumatic tire according to the present invention, since at least three sipes are formed on each block of a tire in such a way as to be arranged at substantially regular intervals along the tire circumferential direction and extend roughly over the entire width of each block, it is possible to improve the traction and brake performance.

Further, since the depth of the central sipe is the deepest as compared with sipes on both sides of each block, it is possible to increase the rigidity of the block on both the sides thereof, thus improving the biased abrasion, adherence characteristics, and edge effects.

What is claimed is:

1. A pneumatic tire of toroidal shape comprising: a cylindrical tread portion and a pair of side wall portions extending from both ends of the tread radially inward, the cylindrical tread portion comprising:
   (a) a plurality of main circumferential grooves arranged at substantially regular intervals along the transversal direction of the tire;
   (b) a plurality of transverse grooves extending across said main circumferential grooves and arranged at substantially regular intervals along the circumferential direction of tire;
   (c) a plurality of blocks partitioned by said main circumferential grooves and said transverse grooves, each of said blocks being formed with at least three sipes arranged at substantially regular intervals along the tire circumferential direction and extending substantially over an entire width of each block in the tire transverse direction in such a way that at least one end of each sipe is open to one of said main circumferential grooves and a central sipe of each block is formed the deepest as compared to the other side sipes, wherein rigidity of each block is uniform in the circumferential direction of the tire to provide a uniform contact pressure distribution against the ground to prevent abrasion at both side ends of said blocks.

2. The pneumatic tire as set forth in claim 1, wherein both ends of each sipe formed in each block are open to one of said main circumferential grooves.

3. The pneumatic tire as set forth in claim 1, wherein said at least three sipes are each formed in zigzag fashion.

4. The pneumatic tire as set forth in claim 1, wherein the central sipe is the deepest and depths of the remaining sipes are decreased from the deepest central sipe.

5. The pneumatic tire as set forth in claim 1, wherein blocks have five sipes; the central sipe and the two adjacent sipes are the deepest and depths of the remaining sipes are decreased from the deepest central and adjacent sipes.

6. The pneumatic tire as set forth in claim 1, wherein width of the central sipe of each block is formed the widest and widths of the remaining sipes are decreased from the widest central sipe.

7. The pneumatic tire as set forth in claim 1, wherein width of each sipe lies within a range from 0.1 to 1.5 mm.

8. The pneumatic tire as set forth in claim 1, wherein an interval between two sipes along the tire circumferential direction is about 2 to 5% of a ground contact length determined when the tire is inflated by a standard pressure under a standard load.

9. The pneumatic tire as set forth in claim 1, wherein the depth of the deepest central sipe is about 70 to 100% of a depth of the main circumferential groove.

10. The pneumatic tire as set forth in claim 1, where the depth of the side sipes is about 30 to 50% of a depth of the main circumferential groove.

11. The pneumatic tire as set forth in claim 7 wherein the width of each sipe is in the range of 0.5 to 1.0 mm.

12. The pneumatic tire as set forth in claim 9 wherein the depth of the deepest central sipe is 75% of a depth of the main circumferential groove.

13. The pneumatic tire as set forth in claim 10 wherein the depth of the side sipes is 40% of a depth of the main circumferential groove.

* * * * *